US009346345B2

(12) United States Patent
Alexander et al.

(10) Patent No.: US 9,346,345 B2
(45) Date of Patent: May 24, 2016

(54) SHAPE MEMORY ALLOY ACTIVE HATCH VENT

(71) Applicants: GM GLOBAL TECHNOLOGY OPERATIONS LLC, Detroit, MI (US); DYNALLOY, INC., Costa Mesa, CA (US)

(72) Inventors: Paul W. Alexander, Ypsilanti, MI (US); Xiujie Gao, Troy, MI (US); Alan L. Browne, Grosse Pointe, MI (US); Mark A. Voss, Richmond, MI (US); Derek L. Patterson, Shelby Township, MI (US); Lei Hao, Troy, MI (US); Chandra S. Namuduri, Troy, MI (US); James Holbrook Brown, Costa Mesa, CA (US); Aragorn Zolno, Whittier, CA (US); John N. Owens, Franklin, MI (US); Alexander Millerman, Bloomfield Hills, MI (US); Kevin B. Rober, Washington, MI (US); Suresh Gopalakrishnan, Farmington Hills, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 14/328,149

(22) Filed: Jul. 10, 2014

(65) Prior Publication Data
US 2014/0349560 A1 Nov. 27, 2014

Related U.S. Application Data

(62) Division of application No. 12/612,112, filed on Nov. 4, 2009, now Pat. No. 8,821,224.

(60) Provisional application No. 61/220,806, filed on Jun. 26, 2009.

(51) Int. Cl.
*B24D 13/00* (2006.01)
*B60H 1/00* (2006.01)
*B61D 27/00* (2006.01)
(Continued)

(52) U.S. Cl.
CPC ............ *B60J 9/04* (2013.01); *B60H 1/00735* (2013.01); *B60H 1/241* (2013.01); *B60H 1/249* (2013.01)

(58) Field of Classification Search
CPC .................................. B60H 1/248; B60H 1/249
See application file for complete search history.

(56) References Cited

U.S. PATENT DOCUMENTS

| 2,573,419 A | * | 10/1951 | Emery | .................. B60H 1/248 |
| | | | | 137/343 |
| 2,846,543 A | * | 8/1958 | Sivacek | .................. H01H 37/50 |
| | | | | 337/123 |

(Continued)

*Primary Examiner* — Steven B McAllister
*Assistant Examiner* — Jonathan Cotov
(74) *Attorney, Agent, or Firm* — Quinn Law Group, PLLC

(57) ABSTRACT

A vent assembly is disposed within an interior space of a vehicle for opening and closing fluid communication between the interior space and an exterior of the vehicle. The vent assembly includes a housing defining a plurality of openings and a plurality of vanes disposed in the openings. An actuator mechanism moves the vanes between an open position and a closed position, and includes a shaped memory alloy (SMA) member for actuating the vanes between the open and closed positions. The SMA member is activated when a hatch of the vehicle is opened to move the vanes into the open position and thereby open fluid communication between the interior space and the exterior to alleviate excessive air pressure buildup during closure of the hatch.

15 Claims, 4 Drawing Sheets

(51) Int. Cl.
   *B63J 2/00*      (2006.01)
   *B60J 9/04*      (2006.01)
   *B60H 1/24*      (2006.01)

(56) References Cited

U.S. PATENT DOCUMENTS

| | | | | |
|---|---|---|---|---|
| 3,392,654 A * | 7/1968 | Grenier | B60H 1/248 | 454/162 |
| 3,436,016 A * | 4/1969 | Edwards | F24F 11/053 | 236/49.5 |
| 3,682,085 A * | 8/1972 | Dennis | F24F 13/15 | 454/319 |
| 4,497,134 A * | 2/1985 | Meyer | E06B 9/04 | 454/224 |
| 4,497,241 A * | 2/1985 | Ohkata | F24F 11/053 | 236/49.5 |
| 4,567,549 A * | 1/1986 | Lemme | F03G 7/065 | 337/140 |
| 4,821,147 A * | 4/1989 | Jacobs | H05K 7/20545 | 211/41.17 |
| 5,071,064 A * | 12/1991 | AbuJudom, II | F03G 7/065 | 236/1 G |
| 5,105,849 A * | 4/1992 | Clough | B60H 1/249 | 137/512.15 |
| 5,107,916 A * | 4/1992 | van Roermund | E06B 9/322 | 160/177 R |
| 5,167,574 A * | 12/1992 | Ikeda | B60H 1/00664 | 137/512.1 |
| 5,509,852 A * | 4/1996 | Clark | B60H 1/00735 | 454/141 |
| 5,662,294 A * | 9/1997 | Maclean | B63B 1/28 | 114/140 |
| 5,816,306 A * | 10/1998 | Giacomel | E06B 9/368 | 160/176.1 P |
| 5,823,870 A * | 10/1998 | Emerling | B60H 1/249 | 137/512.15 |
| 6,004,202 A * | 12/1999 | McCorkel | B60H 1/00378 | 454/137 |
| 6,068,551 A * | 5/2000 | Oremland | B60H 1/248 | 454/162 |
| 6,102,791 A * | 8/2000 | Skoff | B60K 11/00 | 454/162 |
| 6,210,266 B1 * | 4/2001 | Barton | B29C 45/1676 | 137/855 |
| 6,273,127 B1 * | 8/2001 | Wade | B60H 1/249 | 137/512.15 |
| 6,446,876 B1 * | 9/2002 | Stefano | B60H 1/00678 | 236/49.3 |
| 6,609,535 B2 * | 8/2003 | Oppermann | F01L 3/205 | 123/65 V |
| 7,013,656 B2 * | 3/2006 | Yanagimachi | B60H 1/00742 | 165/202 |
| 7,147,269 B2 * | 12/2006 | Aase | B60K 11/085 | 244/204 |
| 7,498,926 B2 * | 3/2009 | Browne | B60H 11/085 | 123/41.06 |
| 7,597,616 B2 * | 10/2009 | Browne | B60H 1/00871 | 454/143 |
| 7,703,839 B2 * | 4/2010 | McKnight | B60H 11/085 | 296/180.5 |
| 7,705,722 B2 * | 4/2010 | Shoemaker | B60H 1/249 | 296/147 |
| 7,748,405 B2 * | 7/2010 | Ghorbal | F16K 31/002 | 137/596.17 |
| 7,854,467 B2 * | 12/2010 | McKnight | F15D 1/10 | 296/180.1 |
| 7,866,737 B2 * | 1/2011 | Browne | F24F 13/1426 | 296/193.1 |
| 7,971,393 B2 * | 7/2011 | Gao | E05F 15/60 | 16/290 |
| 7,992,795 B2 * | 8/2011 | Minor | F03G 7/065 | 236/101 R |
| 8,100,471 B2 * | 1/2012 | Lawall | B60N 2/42763 | 297/216.1 |
| 8,109,318 B2 * | 2/2012 | Browne | B60J 3/002 | 160/1 |
| 8,328,609 B2 * | 12/2012 | Schneider | B60H 1/249 | 454/162 |
| 8,414,366 B2 * | 4/2013 | Browne | F16K 17/003 | 454/162 |
| 2003/0211822 A1 * | 11/2003 | Perlo | B60P 3/04 | 454/141 |
| 2005/0198907 A1 * | 9/2005 | McKnight | B60J 10/0002 | 49/475.1 |
| 2005/0199845 A1 * | 9/2005 | Jones | F16K 15/031 | 251/129.06 |
| 2006/0172694 A1 * | 8/2006 | Gau | F24F 11/053 | 454/333 |
| 2006/0199528 A1 * | 9/2006 | Rivera | B60H 1/249 | 454/359 |
| 2006/0267376 A1 * | 11/2006 | McKnight | B60K 11/085 | 296/180.5 |
| 2007/0123158 A1 * | 5/2007 | Shibata | B60H 1/00871 | 454/130 |
| 2007/0243810 A1 * | 10/2007 | Browne | B60H 1/00871 | 454/152 |
| 2008/0014856 A1 * | 1/2008 | Voit | B60H 1/00378 | 454/158 |
| 2008/0076344 A1 * | 3/2008 | Flowerday | B60H 1/249 | 454/162 |
| 2008/0100079 A1 * | 5/2008 | Herrera | B60R 7/06 | 296/37.1 |
| 2008/0115517 A1 * | 5/2008 | Tacey | B60H 1/248 | 62/244 |
| 2008/0178526 A1 * | 7/2008 | Browne | F24F 13/1426 | 49/82.1 |
| 2008/0200109 A1 * | 8/2008 | Valencia | B60H 1/249 | 454/70 |
| 2008/0271559 A1 * | 11/2008 | Garscha | F03G 7/065 | 74/469 |
| 2009/0088065 A1 * | 4/2009 | Mouch | B60H 1/248 | 454/164 |
| 2010/0099346 A1 * | 4/2010 | Browne | F16K 17/003 | 454/70 |
| 2010/0112924 A1 * | 5/2010 | Alexander | B60H 1/008 | 454/70 |
| 2011/0041930 A1 * | 2/2011 | Kiezulas | B60H 1/249 | 137/527 |
| 2012/0192978 A1 * | 8/2012 | Carlson | B60H 1/249 | 137/855 |
| 2013/0072101 A1 * | 3/2013 | Marleau, Jr. | B60H 1/249 | 454/143 |

* cited by examiner

SHAPE MEMORY ALLOY ACTIVE HATCH VENT

CROSS REFERENCES TO RELATED APPLICATIONS

This application is a divisional patent application of U.S. patent application Ser. No. 12/612,112, filed on Nov. 4, 2009, which claims the benefit of U.S. Provisional Patent Application Ser. No. 61/220,806, filed Jun. 26, 2009, the disclosures of which are hereby incorporated by reference.

TECHNICAL FIELD

The disclosure generally relates to a vent assembly for an interior space of a vehicle, and more specifically to a method of operating a vent assembly for alleviating excessive air pressure buildup in response to closing a hatch of the vehicle.

BACKGROUND

Automotive vehicles include a body defining an interior space, for example a cabin space or a trunk space. The interior space is closed by a hatch, such as a door or a trunk lid. The hatch and/or the body include seals to tightly seal the closure against the body to prevent debris, water, noise, etc, from entering the interior space of the vehicle from around a periphery of the closure. These seals also prevent air from escaping as the hatch is closed, thereby causing an increase in air pressure within the interior space of the vehicle. The increased air pressure within the interior space resists the closing of the hatch, thereby increasing the effort required to close the hatch.

In order to alleviate the buildup of air pressure within the interior space of the vehicle when closing the hatch, some vehicles are equipped with passive pressure relief valves. The passive pressure relief valves open in response to increased air pressure within the interior space of the vehicle to allow air within the interior space to escape, thereby reducing the air pressure within the interior space of the vehicle and reducing the effort to close the hatch. The passive pressure relief valves may include a flexible flap, such as a rubber flap, that is pushed open by the increased air pressure created during closure of the hatch. These types of passive pressure relief valves are biased to close once the air pressure within the interior space of the vehicle equalizes with the ambient air pressure outside of the vehicle.

SUMMARY

A vent assembly for selectively opening and closing an interior space of a vehicle to permit air within the interior space of the vehicle to exit the interior space of the vehicle is disclosed. The vent assembly includes a housing that defines a plurality of openings. The vent assembly further includes a plurality of vanes, with one of the plurality of vanes disposed within each of the plurality of openings. Each of the plurality of vanes is pivotably attached to the housing and is configured for movement in unison between an open position and a closed position. The open position permits fluid flow through the plurality of openings. The closed position prevents fluid flow through the plurality of openings. The vent assembly further includes an actuator mechanism attached to the housing and coupled to at least one of the plurality of vanes. The actuator mechanism is configured for moving the plurality of vanes between the open position and the closed position. The actuator mechanism includes a transmission coupled to the vanes and configured for transmitting rotation to the vanes, and a shape memory alloy member coupled to the transmission. The shape memory alloy member is configured for actuating the transmission in response to an electrical signal.

A method of operating a hatch on a vehicle is also disclosed. The vehicle defines an interior space and includes a vent assembly that is moveable between an open position and a closed position. The open position permits fluid flow into and out of the interior space of the vehicle. The closed position prevents fluid flow into and out of the interior space of the vehicle. The method includes opening the hatch; automatically signaling the vent assembly to move into the open position in response to the opening of the hatch; closing the hatch; and automatically signaling the vent assembly to move into the closed position in response to the closing of the hatch.

Accordingly, the vent assembly provides an active vent assembly that pro-actively opens fluid communication between the interior space of the vehicle and an exterior of the vehicle to alleviate the air pressure within the interior space during closing of the hatch. Pro-actively moving the vent assembly into the open position as soon as the hatch is opened eliminates the need to build up air pressure within the interior space during closure of the hatch prior to opening fluid communication to alleviate excessive air pressure, thereby reducing the effort required to close the hatch.

The above features and advantages and other features and advantages of the present disclosure are readily apparent from the following detailed description of the best modes for carrying out the disclosure when taken in connection with the accompanying drawings.

DETAILED DESCRIPTION

Referring to the Figures, wherein like numerals indicate corresponding parts throughout the several views, a vent assembly is shown generally at 20. The vent assembly 20 is for a vehicle, and opens and closes fluid communication between an interior space 21 of the vehicle and an exterior of the vehicle. Open fluid communication between the interior space 21 and the exterior of the vehicle alleviates excessive air pressure from within the interior space 21 in response to closing a hatch 23 of the vehicle.

Figure 1:
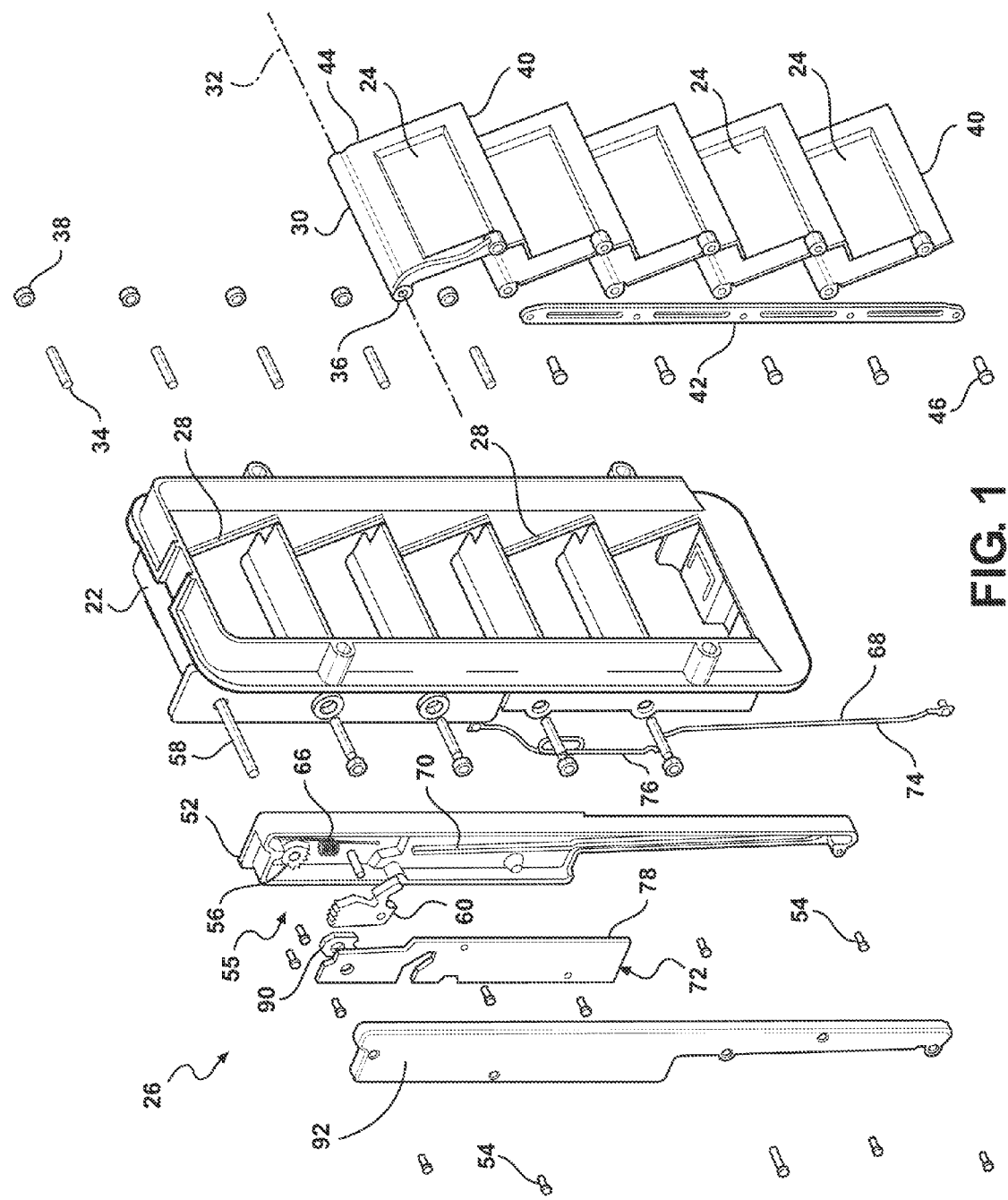
FIG. 1 is an exploded perspective view of a vent assembly.
Figure 2:
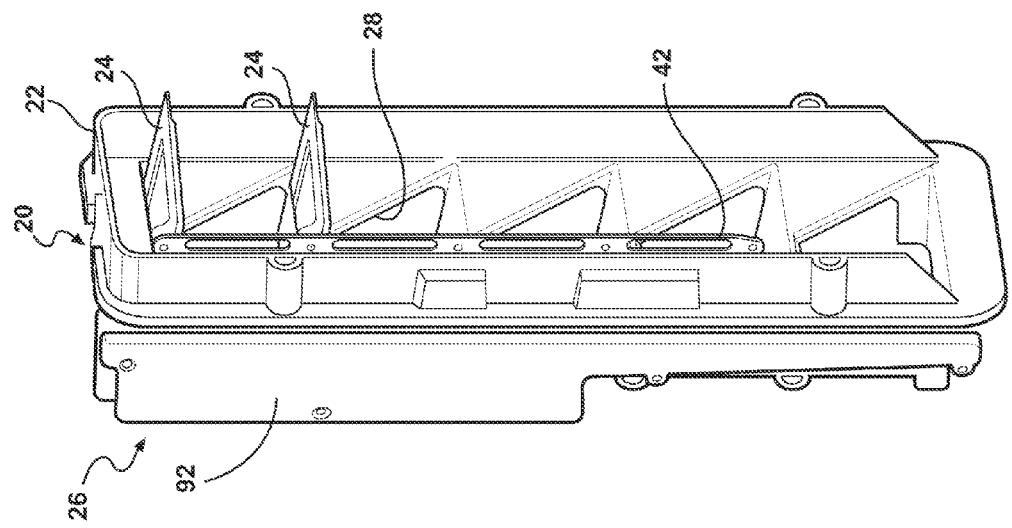
FIG. 2 is a perspective view of the vent assembly in a closed position.
Figure 3:
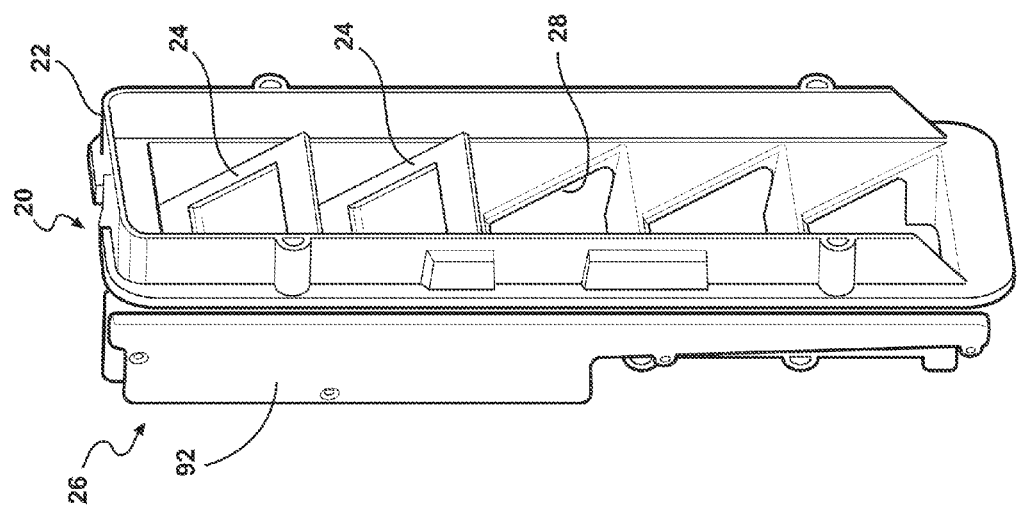
FIG. 3 is a perspective view of the vent assembly in an open position.

Referring to FIG. 1, the vent assembly 20 includes a housing 22, a plurality of vanes 24 pivotably attached to the housing 22, and an actuator mechanism 26 attached to the housing 22 and configured for moving the plurality of vanes 24 in unison between an open position and a closed position. The closed position, shown in FIG. 2, prevents fluid communication between the interior space 21 of the vehicle and the exterior of the vehicle. The open position, shown in FIG. 3, permits fluid communication between the interior space 21 of the vehicle and the exterior of the vehicle. While the vent assembly 20 shown and described in the Figures includes five vanes 24, only two of the five vanes 24 are shown in FIGS. 2 and 3 for clarity.

The housing 22 defines a plurality of openings 28. As shown, the housing 22 defines five different openings 28. However, it should be appreciated that the housing 22 may include any number of openings 28, and that the plurality of vanes 24 will include an equivalent number of vanes 24. It should also be appreciated that the openings 28 and the vanes 24 may be sized and/or configured other than shown to meet specific design requirements and packaging constraints.

One of the vanes 24 is disposed adjacent each of the openings 28. The vanes 24 are moveable between the open position and the closed position to open and close fluid communication through the openings 28. The vent assembly 20 includes a seal on at least one of the housing 22 and/or the vanes 24 to tightly seal the vanes 24 against the housing 22 when the vanes 24 are in the closed position. The seal may include and be manufactured from any suitable material capable of sealing between the vanes 24 and the housing 22 to prevent dirt, dust, water and noise from entering into the interior space 21 of the vehicle when the vanes 24 are in the closed position. It should also be appreciated that the seal may be configured in any suitable shape and configuration to meet the design requirements and constraints of the vehicle.

Each of the vanes 24 includes a first edge 30 adjacent a pivot axis 32 about which the vane 24 pivots relative to the housing 22. The vanes 24 are coupled to the housing 22 along the pivot axis 32, adjacent the first edge 30 of the vanes 24. The vanes 24 may be pivotably coupled to the housing 22 in any suitable manner. It is contemplated that the vanes 24 may include a boss extending outward along the pivot axis 32, with the boss being received within a recess defined by the housing 22 to create the pivotable connection between the vanes 24 and the housing 22. It is alternatively contemplated that the vent assembly 20 may include a pin 34 extending through the housing 22 into a bore 36 defined by the vanes 24 and rotatably supported by a bushing 38 to create the pivotable connection between the vanes 24 and the housing 22. It should be appreciated that the pivotable connection between the vanes 24 and the housing 22 may be accomplished in some other manner not shown or described herein, and may include a combination of different styles of pivotal connections.

Each of the vanes 24 includes a second edge 40 generally parallel to and spaced from the first edge 30. A linkage 42 couples each of the vanes 24 together adjacent the second edge 40 to move the vanes 24 in unison. Accordingly, as will be described in greater detail below, the actuator mechanism 26 is coupled to at least one of the vanes 24, hereinafter referred to as a drive vane 44, to move the drive vane 44 between the open position and the closed position. The linkage 42 couples the drive vane 44 to the other remaining vanes 24 to move the remaining vanes 24 in unison with the drive vane 44 between the open position and the closed position. The vent assembly 20 includes a plurality of rivets 46 interconnecting the linkage 42 and the vanes 24. It should be appreciated that the vanes 24 are pivotable relative to the linkage 42 during movement between the open position and the closed position. It should also be appreciated that the linkage 42 may be pivotably attached to the vanes 24 in some other manner not shown or described herein.

The housing 22 and the vanes 24 may include and be manufactured from any suitable material, such as a plastic material, a composite material, a metal material, or some other similar rigid material capable of maintaining their form during operation to ensure a tight seal between the vanes 24 and the housing 22.

The housing 22 may be assembled to the vanes 24 as described below. The housing 22 includes a first half and a second half. The first half and the second half of the housing 22 are configured for a snap fit connection therebetween. The linkage 42 is first assembled to the vanes 24. The vanes 24 are then positioned in place relative one of the first half and the second half. The first half and the second half of the housing 22 are then snapped together, sandwiching the vanes 24 therebetween. It should be appreciated that the housing 22 may be assembled to the vanes 24 in some other manner not shown or described herein.

Referring back to FIG. 1, the actuator mechanism 26 includes a casing 52. The casing 52 may be attached to the housing 22 through a plurality of actuator fasteners 54, through a snap fit connection, or may alternatively be integrally formed with the housing 22. The casing 52 houses and supports a transmission 55. The transmission 55 is configured for rotating the vanes 24. The transmission 55 includes a vane gear 56 and a geared lever 60. The casing pivotably supports the vane gear 56. A drive shaft 58 couples the vane gear 56 to the drive vane 44 to move the drive vane 44 between the open position and the closed position. The vane gear 56 and the drive vane 44 are keyed for rotational movement with the drive shaft 58. As such, the drive shaft 58 may include a D shaded cross section or the like, with the vane gear 56 and the drive vane 44 defining a correspondingly shaped recess for receiving the drive shaft 58 therein in interlocking rotational engagement.

Figure 5:
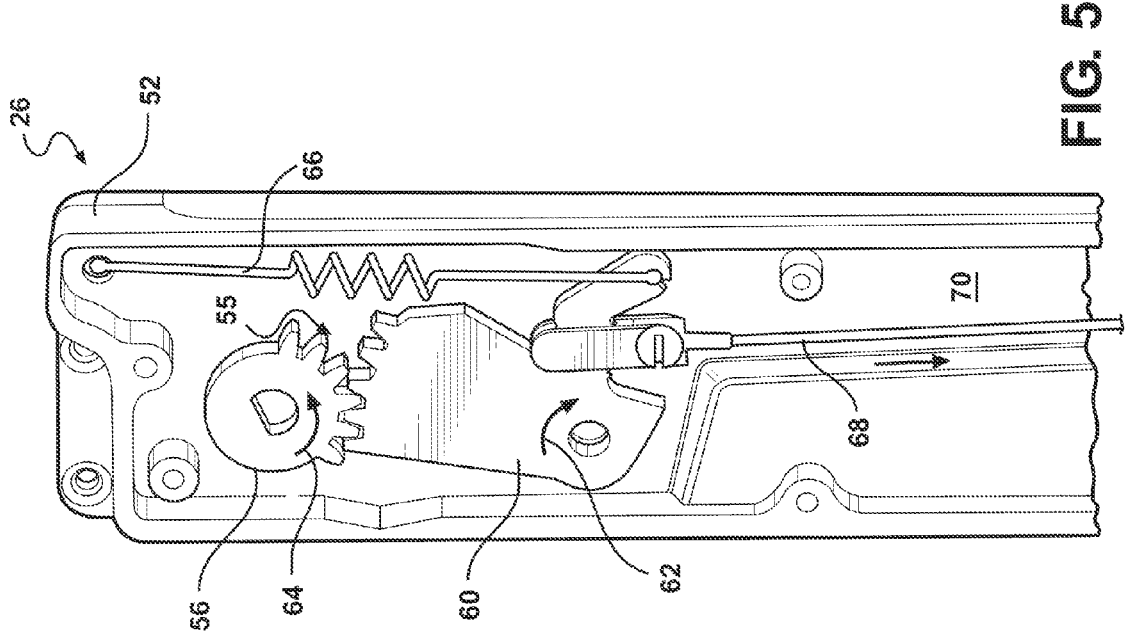
FIG. 5 is a partial fragmentary perspective view of the actuator mechanism of the vent assembly in the open position.
Figure 4:
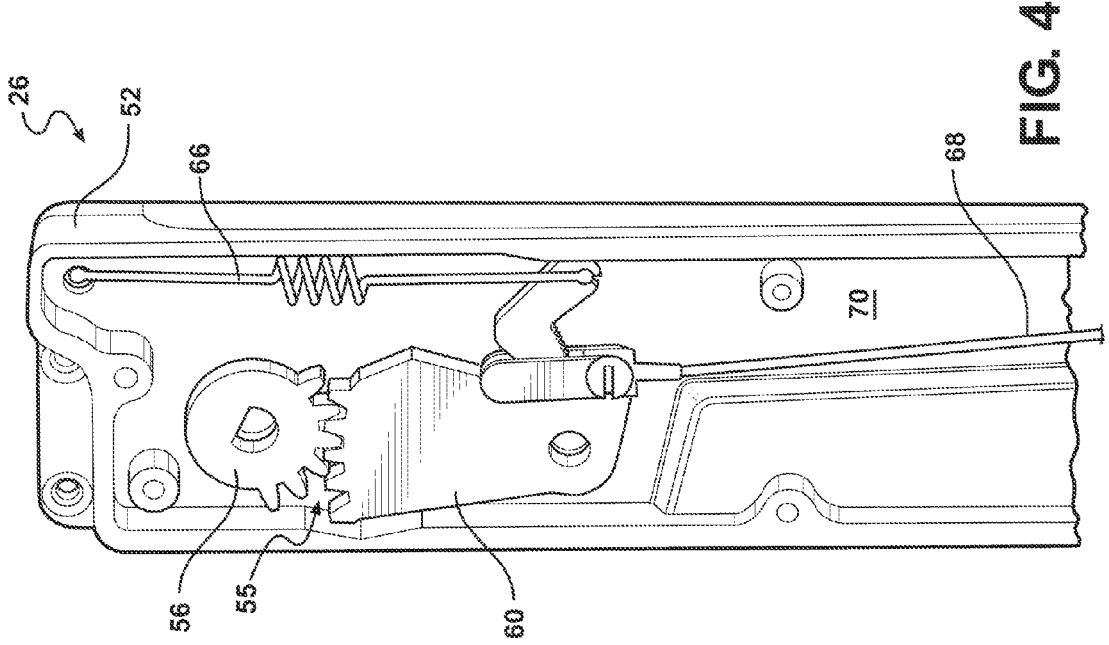
FIG. 4 is a partial fragmentary perspective view of an actuator mechanism of the vent assembly in the closed position.

The casing pivotably supports the geared lever 60. The vane gear 56 and the geared lever 60 are disposed in meshing engagement with each other. Referring to FIG. 4, the vane gear 56 and the geared lever 60 are shown in the closed position. Referring to FIG. 5, the vane gear 56 and the geared lever 60 are shown in the open position. Upon actuation by the actuator mechanism 26, the geared lever 60 rotates clockwise as indicated by arrow 62. In response to the geared lever 60 rotating clockwise, the vane gear 56 rotates counterclockwise, as indicated by arrow 64. The keyed connection between the vane gear 56, the drive shaft 58, and the drive vane 44 causes the drive vane 44 to rotate relative to the housing 22 from the closed position into the open position. A spring 66 is coupled to the geared lever 60 and is configured to urge the geared lever 60 back into the closed position. Accordingly, as will be described in greater detail below, the spring 66 moves the geared lever 60 from the open position, shown in FIG. 5, into the closed position shown in FIG. 4. It should be appreciated that the transmission 55 may be configured in some other manner capable of transferring the linear movement of the SMA member 68 into rotational movement of the drive shaft 58. It should also be appreciated that the spring 66 may be coupled to other components of the vent assembly, such as one of the vanes 24, to urge the vanes into the closed position.

Referring to FIGS. 1, 4 and 5, the actuator mechanism 26 includes a Shape Memory Alloy (SMA) member 68. The SMA member 68 is coupled to the transmission 55, and is configured for actuating the transmission 55 in response to an electrical signal. The SMA member 68 includes a first end coupled to the geared lever 60 and a second end coupled to the casing 52. The SMA member 68 may be coupled to the geared lever 60 and the casing 52 in any suitable manner, including the use of quick connect connectors. The SMA member 68 is routed through a channel 70 defined by the casing 52 to ensure that the SMA member 68 is separated from any heat producing components of the actuator mechanism 26. Alternatively, the casing 52 may define a wall 96 to separate the SMA member 68 from any heat producing components of the actuator mechanism 26. Separating the SMA member 68 from the electrical components ensures that the SMA member 68 from shorting to any of the electrical components within the actuator mechanism 26.

In response to an electrical current, the SMA member 68 heats up and contracts. Contraction of the SMA member 68 causes the geared lever 60 to rotate from the closed position, shown in FIG. 4, into the open position, shown in FIG. 5. In the absence of the electrical current, the SMA member 68 cools and returns to an original shape, i.e., length, of the SMA member 68. As described above, the spring 66 urges the geared lever 60 into the closed position as the SMA member 68 expands during cooling of the SMA member 68. As shown, the actuator mechanism 26 moves the vanes 24 between the open position and the closed position. However, it should be appreciated that the actuator mechanism 26 may move the vanes 24 to any intermediate position between the open position and the closed position, and hold the intermediate position as a final position.

The SMA member 68 includes and is manufactured from a shape memory alloy. Suitable shape memory alloys can exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

The actuator mechanism 26 further includes a Printed Circuit Board Assembly (PCBA 72). A stationary lead wire 74 is attached to the second end of the SMA member 68 and the PCBA 72. A moveable lead wire 76 is attached to the first end of the SMA member 68 and the PCBA 72. The stationary lead wire 74 and the moveable lead wire 76 conduct an electrical current between the PCBA 72 and the SMA member 68 to actuate the SMA member 68.

Figure 6:
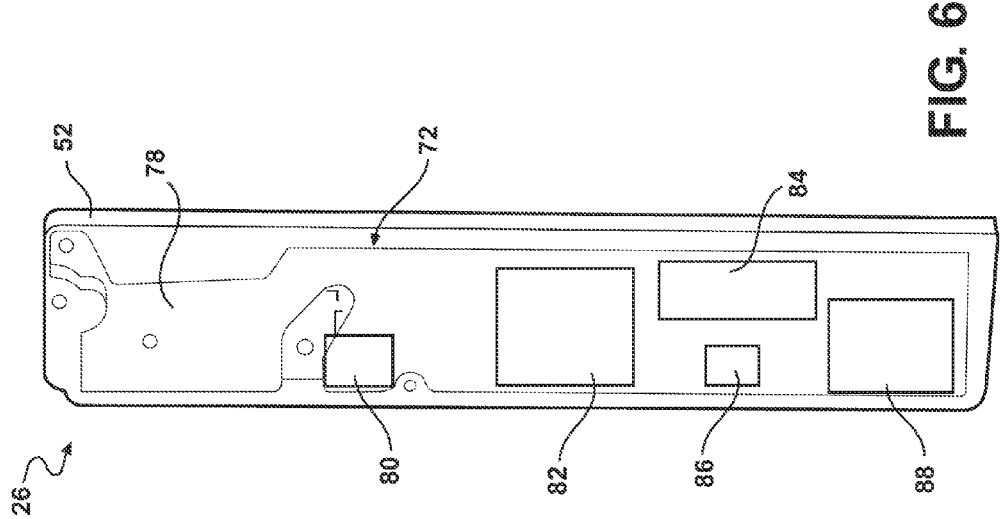
FIG. 6 is a partial fragmentary perspective view of the actuator mechanism.

Referring also to FIG. 6, the PCBA 72 includes a printed circuit board 78 and a power transistor 80 mounted to the printed circuit board 78. The power transistor 80 switches on the SMA member 68 by sending the electrical current to the SMA member 68, and switches off the SMA member 68 by disrupting the electrical current to the SMA member 68.

The PCBA 72 further includes a microcontroller 82 mounted to the printed circuit board 78. The power transistor 80 is in communication with the microcontroller 82. When the actuator mechanism 26 is powered, the microcontroller 82 provides a pulse width modulated signal controlling the power transistor 80 and the power supplied to the SMA member 68. The microcontroller 82 includes a program that provides anywhere from two positions (on and off) to infinite position control. The program can adjust the pulse width modulated signal for many factors, such as ambient temperature.

The PCBA 72 further includes a power connector 84 mounted to the printed circuit board 78. The power connector 84 is in communication with the microcontroller 82. The power connector 84 is an integrated printed circuit board 78 connector that allows for easy attachment to the SMA member 68.

The PCBA 72 further includes a thermistor 86 mounted to the printed circuit board 78. The thermistor 86 is in communication with the microcontroller 82. The thermistor 86 measures environmental temperatures for the microcontroller 82. The thermistor 86 is located on the printed circuit board 78 away from any components that may generate heat.

The PCBA 72 further includes a harness connector 88 mounted to the printed circuit board 78. The harness connector 88 is in communication with the microcontroller 82. The harness connector 88 connects the vent assembly 20 to the vehicle for receiving a signal, i.e., power from the vehicle, to actuate the vent assembly 20.

Referring back to FIG. 1, the actuator mechanism 26 further includes a potentiometer 90. The potentiometer 90 is in communication with the microcontroller 82 and provides information related to the position of the drive shaft 58, and thereby information related to the position of the vane gear 56 and the drive vane 44, to the microcontroller 82. The potentiometer 90 is integrated into the printed circuit board 78, and is coupled to the drive shaft 58. More specifically, the drive shaft 58 extends through a keyed port defined by the potentiometer 90 to measure rotation of the drive shaft 58. Because the potentiometer 90 is coupled to the printed circuit board 78 and the drive shaft 58, precise location of the PCBA 72 within the casing 52 is imperative to ensure the drive shaft 58 does not bind during operation. As such, the PCBA 72 is attached to the casing 52 via fasteners, a snap fit connection, or in some other manner capable of ensuring and maintaining the proper position of the potentiometer 90 relative to the drive shaft 58.

The actuator mechanism may include an electronic overload protection system to prevent the SMA member 68 from being exposed to excessive stress. The microcontroller 82 is operable to control the electronic overload protection system. The electronic overload protection system may include the potentiometer 90, the thermistor 86, and an algorithm operable on the microcontroller 82. The electronic overload protection system is operable to cut power to the SMA member 68 in the event the vanes 24 are restrained from movement. Specifically, the microcontroller 82 may cut power to the SMA member 68 in the event the potentiometer 90 senses the vanes 24 are restrained from movement. It should be appreciated that the electronic overload protection system may be configured other than described herein, in a manner capable of protecting the SMA member 68 from damage.

The actuator mechanism 26 further includes a cover 92. The cover 92 is attached to the casing 52, and seals the various components of the actuator mechanism 26 between the casing 52 and the cover 92. The cover 92 may include a snap fit to the casing 52. Alternatively, the cover 92 may be attached to the casing 52 through a plurality of fasteners.

Figure 7:
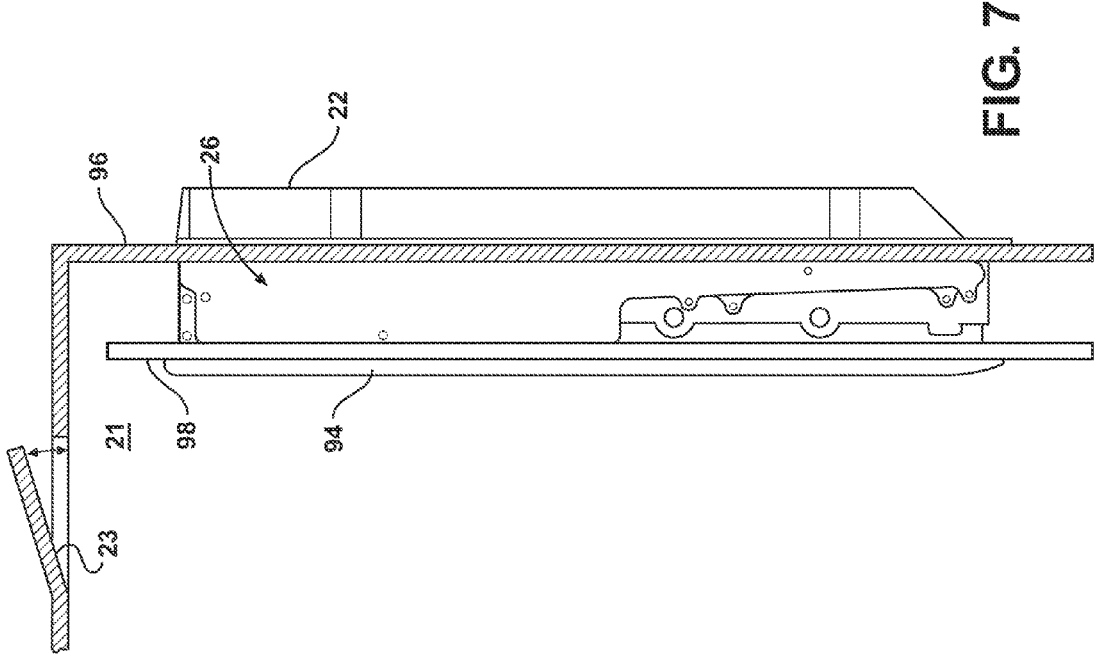
FIG. 7 is a side plan view of the vent assembly installed in a vehicle.

Referring to FIG. 7, the vent assembly 20 may further include grille 94. The grille 94 is an interior trim piece of the vehicle, and prevents foreign objects from entering the vent assembly 20 and becoming lodged between the vanes 24 and the housing 22. Preferably, a snap fit connection attaches the grille 94 to the housing 22. However, it should be appreciated that the grille 94 may be attached to the housing 22 in some other manner. As shown in FIG. 7, the vent assembly 20 is attached to the vehicle. The housing 22 includes one or more clips integrally formed with the housing 22. The clips attach the housing 22 to a wall 96 of the vehicle. The housing 22 includes a gasket around an outer periphery of the housing 22 to seal against the wall 96 of the vehicle, and prevent dust, dirt, water, air or noise from entering the interior space 21 of the vehicle around the outer periphery of the vent assembly 20. The gasket may include any suitable type and configuration of gasket. The grille 94 sandwiches an interior carpet 98 between the housing 22 and the grill from within the interior space 21 of the vehicle to complete the installation.

In operation, the vent assembly 20 is attached to the vehicle, within the interior space 21 of the vehicle as described above. For example, the interior space 21 of the vehicle may be defined as a trunk and the hatch 23 may be defined as a trunk lid. The normal position of the vent assembly 20 is the closed position, wherein all of the vanes 24 are sealed against the housing 22 to prevent fluid communication between the interior space 21 and the exterior of the vehicle. As described above, the spring 66 within the actuator mechanism 26 biases the geared lever 60 into the closed position. The sealing force supplied by the spring 66, in combination with the rigid vanes 24 and the seals between the vanes 24 and the housing 22 eliminate an influx of air, water, dirt, dust, or noise into the hatch 23.

The vent assembly 20 is actively opened on demand, i.e., the vent assembly 20 is opened automatically prior to closing the hatch 23. Preferably, the position of the hatch 23 triggers operation of the vent assembly 20. The vehicle includes a vehicle controller and a sensor system for sensing a position of the hatch 23, e.g., an open position or a closed position. The vehicle controller controls the operation of the vent assembly 20. The vehicle controller may include a computer and/or processor, and include all software, hardware, memory, algorithms, connections, sensors, etc., necessary to manage and control the operation of the vent assembly 20. As such, a method, described below, may be embodied as a program operable on the vehicle controller. It should be appreciated that the vehicle controller may include any device capable of analyzing data from various sensors, comparing data, making the necessary decisions required to control the operation of the vent assembly 20 and executing the required tasks necessary to control the operation of the vent assembly 20.

Once the sensor system indicates that the hatch 23 is open, the vehicle controller engages other vehicle systems, such as interior lights, etc. The vehicle controller and sensor system are also utilized to control the vent assembly 20. Accordingly, once the sensor system senses that the hatch 23 is open, the vehicle controller signals the vent assembly 20 to move into the open position. The signal to the vent assembly 20 is the device power supply, i.e., the vehicle controller signals the vent assembly 20 to move into the open position by supplying power to the vent assembly 20. The microcontroller 82 in the actuator mechanism 26 directs the electrical current to the SMA member 68, which causes the SMA member 68 to heat. As the temperature of the SMA member 68 increases, the SMA member 68 contracts, rotating the geared lever 60, and thereby the vanes 24, into the open position.

The vanes 24 of the vent assembly 20 remain in the open position until the sensor system senses that the hatch 23 is closed. As such, fluid communication from within the interior space 21 to the exterior of the vehicle is actively opened, i.e., automatically opened, whenever the hatch 23 is opened. The fluid communication remains open until the hatch 23 is closed. Therefore, there is no air pressure buildup within the interior space 21 as the hatch 23 closes because the air is free to exit the interior space 21 through the vent assembly 20 as the hatch 23 is closed. The prevention of air pressure buildup prior to closing the hatch 23 greatly reduces the closing effort required to close the hatch 23. Once the sensor system senses that the hatch 23 is closed, the vehicle controller disconnects the power supply to the actuator mechanism 26, thereby disrupting the electrical current to the SMA member 68. Without the electrical current, the SMA member 68 begins to cool and returns to the original length of the SMA member 68. The spring 66 automatically urges the geared lever 60, and thereby the vanes 24, back into the closed position. Alternatively, in the event the hatch 23 remains open, the actuator mechanism 26 may be configured to move the vanes 24 into the closed position after the expiration of a pre-determined time interval.

The vent assembly 20 may include an alert feature configured to notify an operator that the vent assembly 20 is disposed in the open position. The alert feature may include backlighting of the vanes, a warning light in the vehicle, a buzzer, or some other system of notifying the operator that the vent assembly 20 is in the open position.

During operation of the vent assembly 20, the vehicle controller may sense if movement of the plurality of vanes 24, between the open position and the closed position, is partially blocked by a blockage. The blockage may include, but is not limited to, an accumulation of snow and ice, or some mechanical malfunction or obstruction that is partially blocking the movement of the vanes 24. The vehicle controller may sense the blockage in any suitable manner, such as by measuring a resistance to movement of the vanes 24, or by comparing an actual position of the vanes 24 to a projected or modeled position of the vanes 24 for the current given operating conditions of the vent assembly 20. It should be appreciated that the vehicle controller may sense and/or determine that the vanes 24 are obstructed by the blockage in some other manner not specifically described herein.

When the vehicle controller senses that the plurality of vanes 24 are blocked from fully moving into the open position by the blockage, the vehicle controller may move the plurality of vanes into a partially open position. The partially open position is a position disposed between the closed position and the open position. More specifically, the vehicle controller may move the plurality of vanes 24 toward the open position until the plurality of vanes 24 encounter the blockage preventing further movement of the plurality of vanes into the open position. The position at which the vanes encounter the blockage may be defined as the partially open position. By only moving the vanes 24 into the partially open position when the blockage prevents the vanes 24 from fully moving into the open position, the vehicle controller limits potential damage to the vent assembly 20.

In order to prevent undesirable actuation, i.e., opening, of the vent assembly 20, the vehicle controller may monitor at least one operating condition of the vehicle. The at least one operating condition of the vehicle may include, but is not limited to, a speed of the vehicle or an ambient air temperature of the vehicle adjacent the hatch 23. The vehicle controller may then determine if all of the operating conditions of the vehicle being monitored are within a respective allowable range, or are not within their respective allowable range. The allowable range for each of the different operating conditions of the vehicle is the range at which it is permissible to open the vent assembly 20, i.e., it is permissible to move the vanes 24 of the vent assembly 20 into the open position. As such, if any of the operating conditions of the vehicle are outside of their respective allowable range, it is generally not permissible to move the vent assembly 20 into the open position.

When all of the operating conditions of the vehicle being monitored by the vehicle controller are within their respective allowable ranges, the vehicle controller may automatically signal the vent assembly 20 to move into the open position in response to the opening of the hatch 23. However, if any one of the plurality of operating conditions of the vehicle being monitored by the vehicle controller are not within their respective allowable ranges, then the vehicle controller may not signal the vent assembly 20 to move into the open position in response to the opening of the hatch 23, thereby keeping the vent assembly 20 in the closed position, even if the hatch 23 is opened.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of operating a hatch on a vehicle defining an interior space and including a vent assembly moveable between an open position and a closed position, with the open position permitting fluid flow into and out of the interior space of the vehicle and the closed position preventing fluid flow into and out of the interior space of the vehicle, the method comprising:
   opening the hatch;
   automatically signaling the vent assembly with a vehicle controller to move into the open position in response to the opening of the hatch;
   wherein the vent assembly includes a plurality of vanes moveable between the open position and the closed position, and a shape memory alloy member having a first end coupled to a geared lever and a second end coupled to a casing, with the geared lever in meshing engagement with a vane gear such that linear movement of the shape memory alloy member rotates the geared lever and the vane gear, which in turn moves the plurality of vanes between the open position and the closed position, and wherein signaling the vent assembly to move into the open position includes heating the shape memory alloy member to contract the shape memory alloy member, thereby rotating the geared lever and the vane gear in a first direction to move the plurality of vanes into the open position;
   closing the hatch; and
   automatically signaling the vent assembly with the vehicle controller to move into the closed position in response to the closing of the hatch;
   wherein the vent assembly includes a spring operable to urge the plurality of vanes into the closed position, and wherein signaling the vent assembly to move into the closed position includes cooling the shape memory alloy member to elongate the shape memory alloy member, thereby allowing the spring to rotate the geared lever and the vane gear in a second direction to move the plurality of vanes into the closed position.

2. The method set forth in claim 1 further comprising sensing a position of the plurality of vanes.

3. The method set forth in claim 2 further comprising sensing if movement of the plurality of vanes between the open position and the closed position is partially blocked by a blockage.

4. The method set forth in claim 3 further comprising moving the plurality of vanes into a partially open position, disposed between the closed position and the open position, when the plurality of vanes are blocked from fully moving into the open position by the blockage.

5. The method set forth in claim 4 wherein moving the plurality of vanes into the partially open position is further defined as moving the plurality of vanes toward the open position until the plurality of vanes encounter the blockage preventing further movement of the plurality of vanes into the open position.

6. The method set forth in claim 1 further comprising monitoring at least one operating condition of the vehicle.

7. The method set forth in claim 6 wherein the at least one operating condition of the vehicle is a speed of the vehicle or an ambient air temperature of the vehicle adjacent the hatch.

8. The method set forth in claim 6 further comprising determining if all of the at least one operating conditions of the vehicle are within a respective allowable range or are not within their respective allowable range.

9. The method set forth in claim 8 wherein automatically signaling the vent assembly with the vehicle controller to move into the open position in response to the opening of the hatch is further defined as automatically signaling the vent assembly with the vehicle controller to move into the open position in response to the opening of the hatch, when all of the at least one operating conditions of the vehicle are within their respective allowable range.

10. The method set forth in claim 1 further comprising signaling the vent assembly to move into the closed position in response to the hatch being positioned in the open position for a pre-determined period of time.

11. A method of operating a hatch on a vehicle defining an interior space and including a vent assembly moveable between an open position and a closed position, with the open position permitting fluid flow into and out of the interior space of the vehicle and the closed position preventing fluid flow into and out of the interior space of the vehicle, the method comprising:
   monitoring at least one operating condition of the vehicle;
   determining if all of the at least one operating conditions of the vehicle are within a respective allowable range or are not within their respective allowable range;
   opening the hatch;
   automatically signaling the vent assembly with a vehicle controller to move into the open position in response to the opening of the hatch, when all of the at least one operating conditions of the vehicle are within their respective allowable range;

wherein the vent assembly includes a plurality of vanes moveable between the open position and the closed position, and a shape memory alloy member having a first end coupled to a geared lever and a second end coupled to a casing, with the geared lever in meshing engagement with a vane gear such that linear movement of the shape memory alloy member rotates the geared lever and the vane gear, which in turn moves the plurality of vanes between the open position and the closed position, and wherein automatically signaling the vent assembly to move into the open position includes heating the shape memory alloy member to contract the shape memory alloy member, thereby rotating the geared lever and the vane gear in a first direction to move the plurality of vanes into the open position;

closing the hatch; and automatically signaling the vent assembly with the vehicle controller to move into the closed position in response to the closing of the hatch;

wherein the vent assembly includes a spring operable to urge the plurality of vanes into the closed position, and wherein automatically signaling the vent assembly to move into the closed position includes cooling the shape memory alloy member to elongate the shape memory alloy member, thereby allowing the spring to rotate the geared lever and the vane gear in a second direction to move the plurality of vanes into the closed position.

12. The method set forth in claim 11 further comprising not signaling the vent assembly to move into the open position in response to the opening of the hatch when at least one of the at least one operating condition of the vehicle is not within its respective allowable range.

13. The method set forth in claim 11 further comprising sensing if movement of the plurality of vanes between the open position and the closed position is partially blocked by a blockage.

14. The method set forth in claim 13 further comprising moving the plurality of vanes into a partially open position, disposed between the closed position and the open position, when the plurality of vanes are blocked from fully moving into the open position by the blockage.

15. The method set forth in claim 14 wherein moving the plurality of vanes into the partially open position is further defined as moving the plurality of vanes toward the open position until the plurality of vanes encounter the blockage preventing further movement of the plurality of vanes into the open position.

* * * * *